United States Patent
Park

(10) Patent No.: US 12,344,210 B2
(45) Date of Patent: Jul. 1, 2025

(54) BRAKE DEVICE FOR VEHICLE

(71) Applicant: HYUNDAI MOBIS CO., LTD., Seoul (KR)

(72) Inventor: Si Yoon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/364,757

(22) Filed: Aug. 3, 2023

(65) Prior Publication Data
US 2024/0149852 A1 May 9, 2024

(30) Foreign Application Priority Data

Nov. 4, 2022 (KR) .................. 10-2022-0146147

(51) Int. Cl.
*B60T 13/74* (2006.01)
*B60T 13/16* (2006.01)
*F15B 15/14* (2006.01)

(52) U.S. Cl.
CPC ............ *B60T 13/745* (2013.01); *B60T 13/16* (2013.01); *F15B 15/14* (2013.01); *F15B 2015/1495* (2013.01)

(58) Field of Classification Search
CPC .............. F15B 15/1471; F15B 15/1414; B60T 13/745; B60T 13/74
See application file for complete search history.

(56) References Cited

U.S. PATENT DOCUMENTS

| | | | |
|---|---|---|---|
| 9,003,903 B2 * | 4/2015 | Drumm | H02K 7/06 74/89.23 |
| 10,272,891 B2 * | 4/2019 | Malwitz | F16D 65/16 |
| 10,730,495 B2 * | 8/2020 | Ganzel | B60T 8/368 |
| 10,875,516 B2 * | 12/2020 | Lee | B60T 13/745 |
| 10,919,510 B2 * | 2/2021 | Alili | B60T 13/745 |
| 11,014,543 B2 * | 5/2021 | Starr | F16D 65/16 |
| 11,021,140 B2 * | 6/2021 | Starr | B60T 8/368 |
| 11,248,600 B2 * | 2/2022 | Weh | F04B 9/047 |
| 11,912,252 B2 * | 2/2024 | Weh | F15B 15/20 |
| 11,999,327 B2 * | 6/2024 | Park | B60T 13/745 |
| 2018/0029575 A1 * | 2/2018 | Malwitz | F16D 65/16 |
| 2021/0388829 A1 * | 12/2021 | Weh | F04B 39/122 |
| 2022/0169225 A1 * | 6/2022 | Hong | G01D 5/12 |

FOREIGN PATENT DOCUMENTS

KR 10-2020-0066704 A 6/2020

* cited by examiner

*Primary Examiner* — Thomas E Lazo
(74) *Attorney, Agent, or Firm* — NovoTechIP International PLLC

(57) ABSTRACT

Proposed is a brake device for a vehicle including a housing, a cylinder installed within the housing, a motor coupled to the cylinder and providing a rotational force, a screw shaft installed within the cylinder and axially rotated by the rotational force of the motor, a nut coupled to the screw shaft through the medium of a ball member and reciprocating in the axial direction of the screw shaft depending on a rotation direction of the screw shaft, a piston coupled to the nut and moved by being interlocked with the nut, a guide provided within the cylinder and restricting the rotation of the nut and providing guidance to a rectilinear motion of the nut, and a cover coupled to the cylinder and covering the guide.

19 Claims, 12 Drawing Sheets

BRAKE DEVICE FOR VEHICLE

CROSS-REFERENCE TO RELATED APPLICATIONS

This application claims the benefit under 35 U.S.C. § 119(a) of priority to Korean Patent Application No. 10-2022-0146147 filed on Nov. 4, 2022, in the Korean Intellectual Property Office, the entire disclosure of which is incorporated herein by reference for all purposes.

TECHNICAL FIELD

Exemplary embodiments of the present disclosure relate to a brake device for a vehicle, and more particularly, to a brake device for a vehicle, which can change a rotatory motion of a screw that is rotated by a rotational force of a motor into a rectilinear motion of a piston.

BACKGROUND

In general, in view of the characteristics of an electrically-driven brake device for a vehicle, there is a need for a device for generating braking fluid pressure by changing a rotatory motion of a motor into a rectilinear motion of a piston within a cylinder.

As the device for changing the rotatory motion of the motor into the rectilinear motion of the piston, a ball screw device, including a screw shaft that is axially rotated by the rotational force of the motor, a nut that is coupled to the screw shaft through the medium of balls and that is moved in the axial direction of the screw shaft, and the piston that is coupled to the nut and that pressurizes an operating fluid within the cylinder, is applied to the electrically-driven brake device.

In view of the characteristics of the ball screw device that performs a reciprocating motion while being rotated forward and backward depending on a change in the direction of the rotational force that is generated by the motor, the coupling between the nut and the piston may be released when the direction of the rotational force is changed for the reciprocation straight movement.

Furthermore, an axial load attributable to an oil pressure reaction of the cylinder is supported by the motor. The sizes and weight of a motor housing and bearings may need to be increased as the motor must be sufficiently rigid to support an axial load.

The Background technology of the present disclosure is disclosed in Korean Patent Application Publication No. 10-2020-0066704 (Jun. 10, 2020) entitled "INTEGRATED HYDRAULIC MODULE OF AN ELECTROHYDRAULIC SERVO BRAKE".

SUMMARY

Various embodiments are directed to a brake device for a vehicle, which can provide guidance to a rectilinear motion of a nut that is coupled to a screw through the medium of a ball member.

Furthermore, various embodiments are directed to a brake device for a vehicle, which can prevent a guide from deviating from its axial direction through a cover that is coupled to a cylinder.

Furthermore, various embodiments are directed to a brake device for a vehicle, which can prevent loosening between the nut and a piston that have been coupled together.

Furthermore, various embodiments are directed to a brake device for a vehicle, which can bidirectionally support an axial load attributable to a reaction when oil pressure is formed, through a bearing that is coupled to the cylinder.

Furthermore, various embodiments are directed to a brake device for a vehicle, which prevents an axial load attributable to oil pressure from being transferred to a motor through the bearing that is coupled to the cylinder.

Furthermore, various embodiments are directed to a brake device for a vehicle, which can omit the existing axial alignment assembly single products by using perpendicularity and concentricity compensations using a gap of the bearing itself.

In an embodiment, a brake device for a vehicle may include a housing, a cylinder installed within the housing, a motor coupled to the cylinder and configured to provide a rotational force, a screw shaft installed within the cylinder and axially rotated by the rotational force of the motor, a nut coupled to the screw shaft through the medium of a ball member and configured to reciprocate in an axial direction of the screw shaft depending on a rotation direction of the screw shaft, a piston coupled to the nut and configured to move by being interlocked with the nut, a guide provided within the cylinder and configured to restrict the rotation of the nut and to guide a rectilinear motion of the nut, and a cover coupled to the cylinder and configured to cover the guide.

The brake device may further include a sleeve provided within the cylinder and configured to enable the piston to be inserted therein and to move.

A port for moving a hydraulic fluid may be formed in the cylinder. A cutoff hole may be formed in an outer surface of the sleeve in fluid communication with the port.

The piston may include a rod spirally coupled to the outer surface of the nut, and a head integrally formed with the rod and configured to reciprocate within the sleeve in a lengthwise direction of the sleeve.

The brake device may further include a bearing provided within the cylinder, coupled to the screw shaft, and configured to support an axial load when oil pressure is formed within the cylinder.

The motor may include a fixing part fixed to the housing that produces a varying magnetic force when supplied with electric power, a motor rotation part connected to the screw shaft and rotating in unison with the screw shaft in response to changes in the magnetic force produced by the fixing part, and a motor bearing arranged between the fixing part and the motor rotation part and configured to reduce friction that occurs when the motor rotation part is rotated.

The motor rotation part may include a rotation frame rotatably installed within the fixing part and installed in a form in which the rotation frame surrounds one side of the cylinder, and a rotor installed on an outer surface of the rotation frame that faces the fixing part and rotating in response to the magnetic force.

The screw shaft may include a body rotatably installed within the cylinder and configured to have a spiral gear formed on the outer surface thereof, a first coupling part configured to extend from the body to one side thereof and coupled to the rotation frame by a spline part, and a second coupling part configured to extend from the body to the other side thereof and rotatably coupled to the bearing.

The guide may include a guide member inserted between the cylinder and the nut.

The guide may include a first guide groove that is recessed into the inner surface of the cylinder, and a second guide groove that is recessed into the outer surface of the nut at a position corresponding to the first guide groove such that the first guide groove and the second guide groove form a space. The guide member may be disposed between the first guide groove and the second guide groove in the space.

The brake device may further include a support protrusion formed to protrude into the inner surface of the cylinder and configured to support an end of the guide member on one side thereof. The support protrusion may be disposed at the end of the first guide groove on the one side.

An inclined plane inclined toward a central part of the guide member may be formed at the end of the guide member on the other side thereof.

The cover may include a first frame formed in a ring form, a second frame disposed in a circumference part of the first frame, disposed to be spaced apart from the first frame, and formed in a ring form, and a rib configured to connect the first frame and the second frame.

The cover may include an elastically deformable material. The second frame may be pressed in and coupled to the outer circumference surface of the cylinder.

An interval between the first frame and the second frame may be smaller than the diameter of the guide member.

The brake device may further include a flange at an end of the nut on one side thereof. The second guide groove may be formed on the outer surface of the flange. The flange may rectilinearly move along the guide member.

The guide may include a first guide protrusion formed to protrude from the inner surface of the cylinder, and a third guide groove depressed and formed on the outer surface of the nut so that the third guide groove corresponds to the first guide protrusion. The nut may rectilinearly move along the first guide protrusion.

The guide may include a fourth guide groove depressed and formed on the inner surface of the cylinder, and a second guide protrusion formed to protrude from the outer surface of the nut so that the second guide protrusion corresponds to the fourth guide groove. The nut may rectilinearly move along the fourth guide groove.

The brake device may further include a retaining part installed between the nut and the piston and configured to have an opening.

A first groove depressed and formed on the outer surface of the nut so that a part of the retaining part is accommodated in the first groove may be provided in the nut. A second groove configured to correspond to the first groove and depressed and formed on the inner surface of the piston so that the remaining part of the retaining part is accommodated in the second groove may be provided in the piston.

The present disclosure has effects in that a rotatory motion of the screw shaft can be changed into a rectilinear motion of the piston, costs can be reduced, and NVH performance can be improved, through the construction of the guide that restricts the rotation of the nut that moves along the screw shaft and that provide guidance to a rectilinear motion of the nut.

Furthermore, the present disclosure has effects in that the guide member can be prevented from deviating from its axial direction and whether the guide member has been assembled in position can be easily checked, through the construction of the cover that is pressed in and fixed to the cylinder.

Furthermore, the present disclosure has an effect in that loosening between the nut and the piston that are spirally coupled together can be prevented through the construction of the retaining part that is installed between the nut and the piston.

Furthermore, the present disclosure has an effect in that an axial load attributable to oil pressure is not transferred to the motor because the axial load attributable to a reaction when the oil pressure is formed can be bidirectionally supported through the bearing that is coupled to the cylinder.

Furthermore, the present disclosure has an effect in that weight and the sizes of the housing and the bearing can be reduced because the axial load is not supported by the motor.

Furthermore, the present disclosure has effects in that costs can be reduced and a full length in an axial direction can be reduced because the existing axial alignment assembly single products can be omitted by using perpendicularity and concentricity compensations using a gap of the bearing itself.

DETAILED DESCRIPTION

Figure 1:
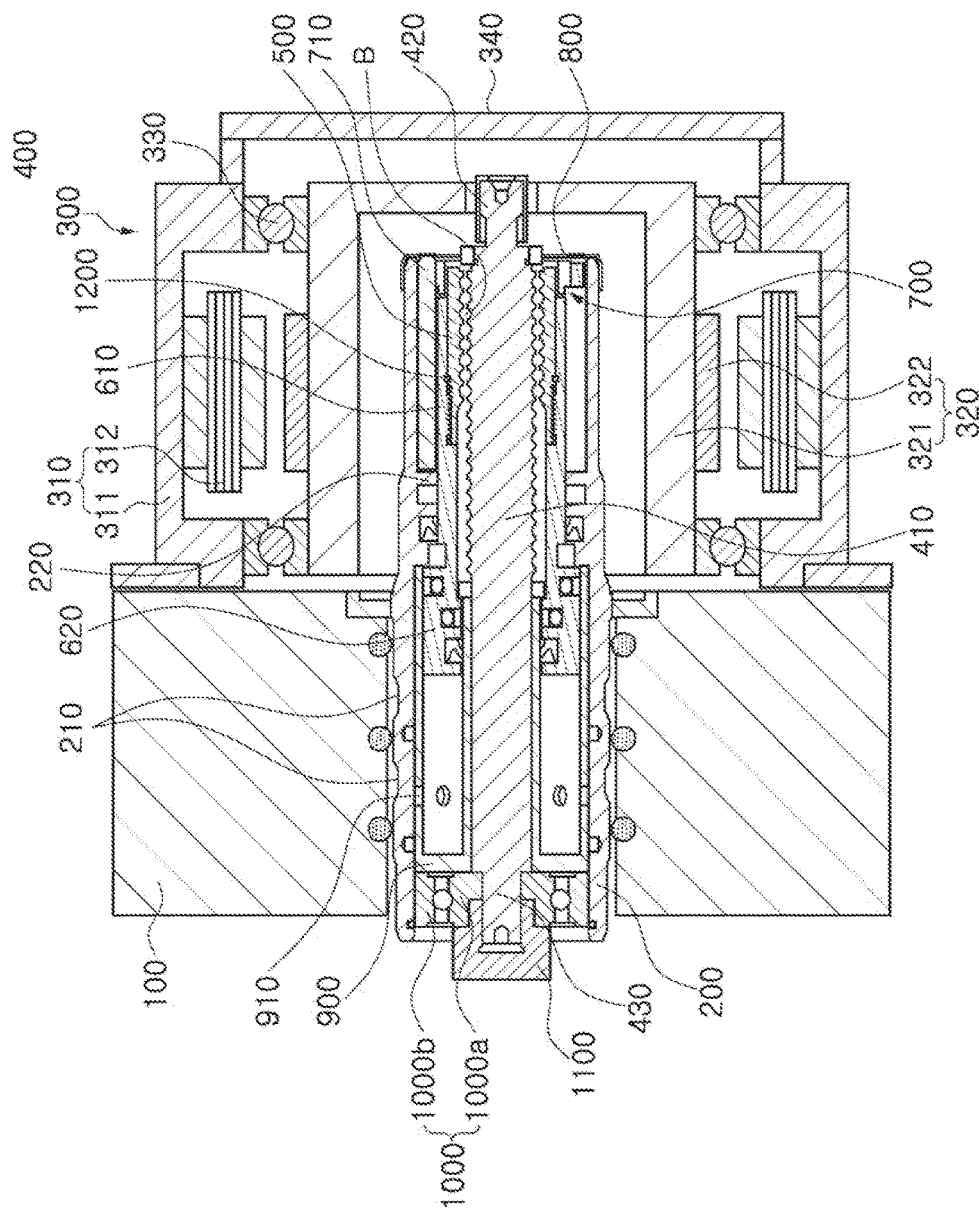
FIG. 1 is a cross-sectional view illustrating a brake device for a vehicle according to an embodiment of the present disclosure.

Hereinafter, a brake device for a vehicle will be described below with reference to the accompanying drawings through various exemplary embodiments. In such a process, the thickness of a line or the size of an element illustrated in the drawings may have been exaggerated for the clarity of a description and for convenience' sake. Terms to be described below have been defined by taking into consideration their functions in the present disclosure, and may be different depending on a user or operator's intention or practice. Accordingly, such terms should be interpreted based on the overall contents of this specification.

Figure 2:
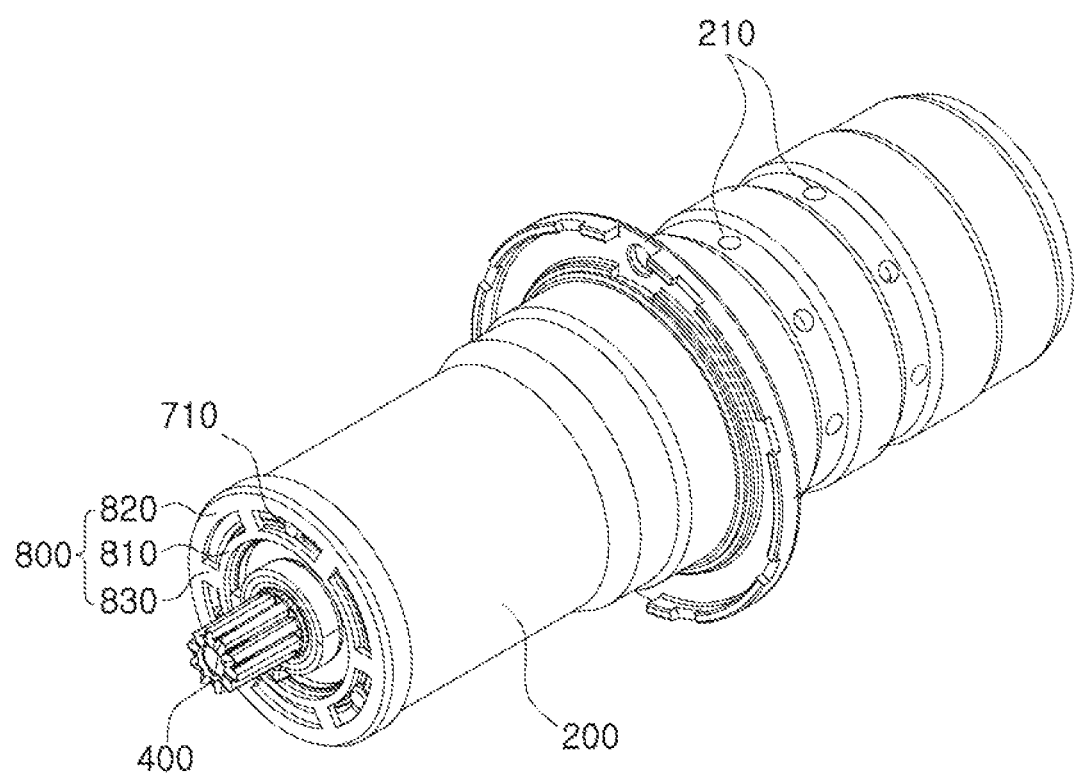
FIG. 2 is a perspective view illustrating a cylinder in the brake device for a vehicle according to an embodiment of the present disclosure.
Figure 3:
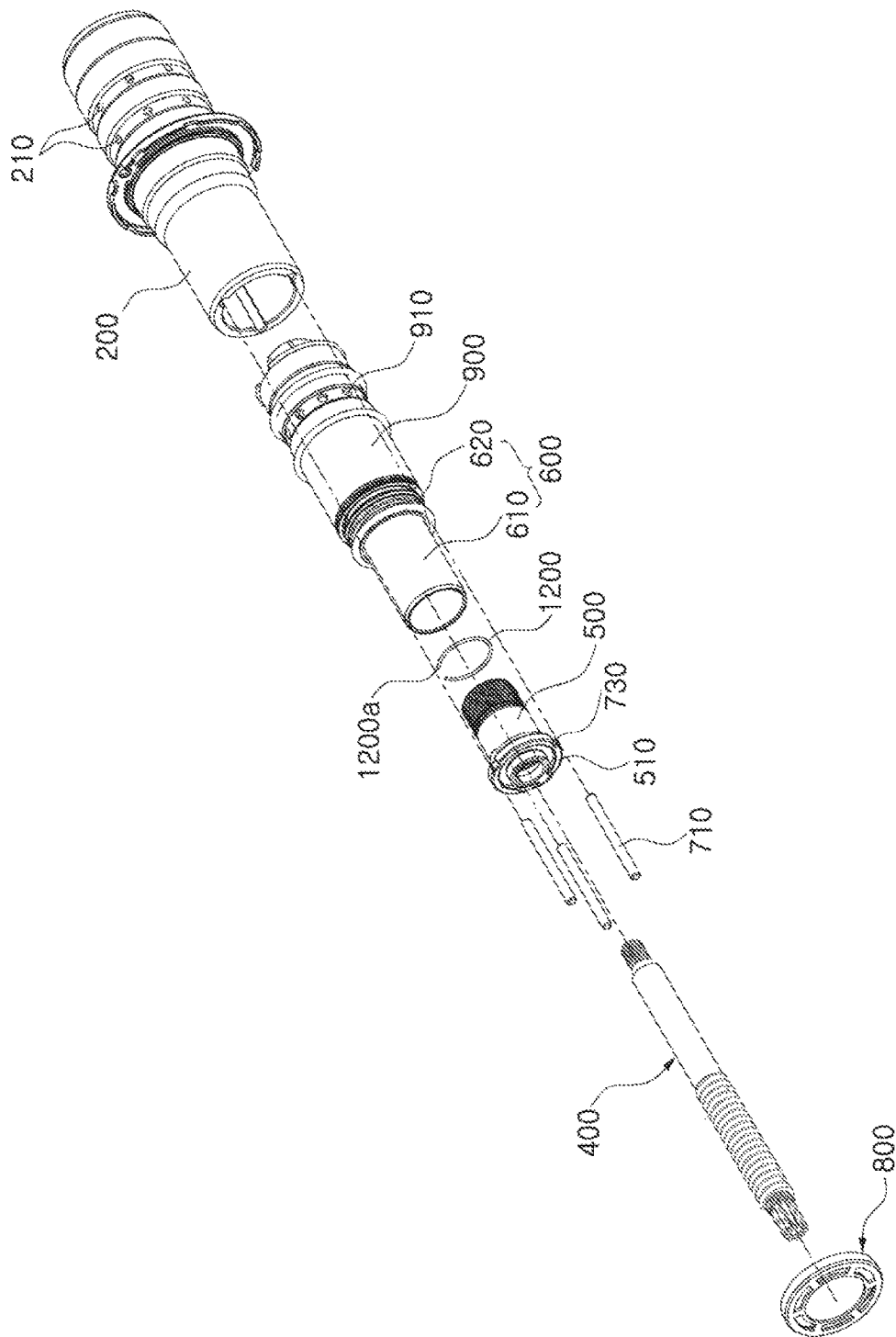
FIG. 3 is an exploded perspective view of the cylinder in FIG. 2.
Figure 4:
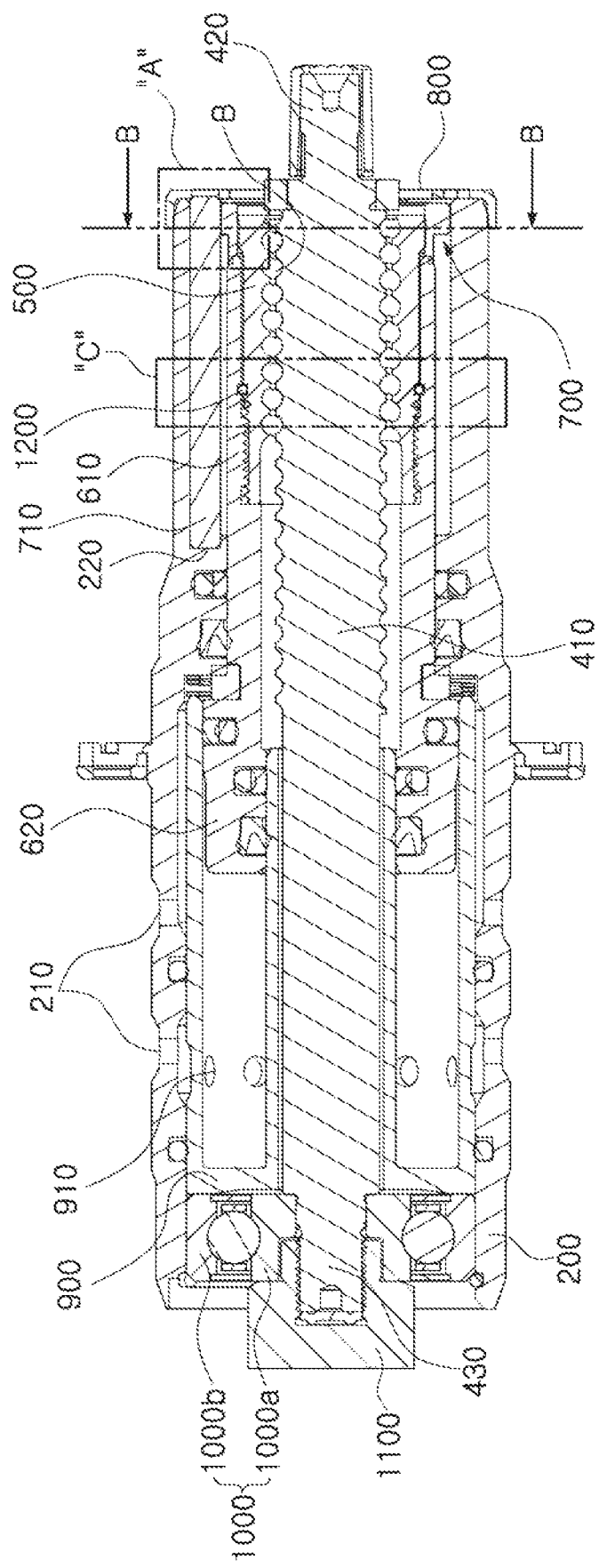
FIG. 4 is a cross-sectional view of the cylinder in FIG. 2.
Figure 5:
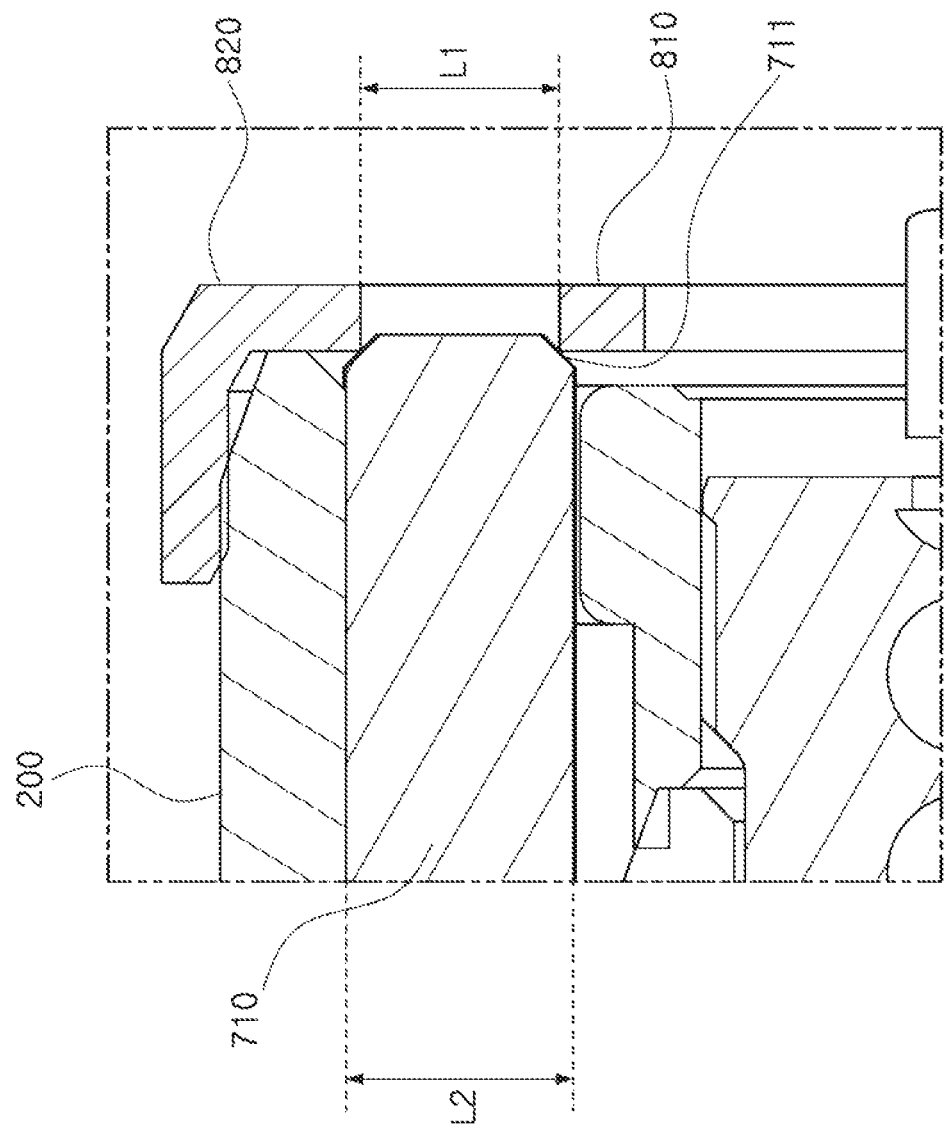
FIG. 5 is an enlarged partial cross-sectional view of "A" in FIG. 4.
Figure 9:
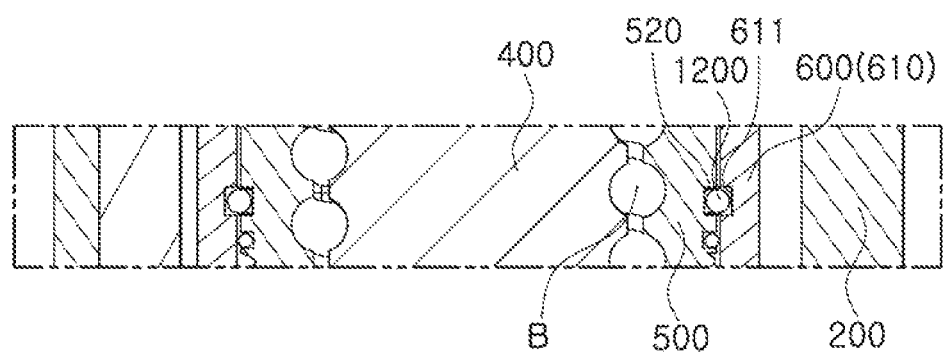
FIG. 9 is an enlarged partial cross-sectional view of "C" in FIG. 4.

FIG. 1 is a cross-sectional view illustrating a brake device for a vehicle according to an embodiment of the present disclosure. FIG. 2 is a perspective view illustrating a cylinder in the brake device for a vehicle according to an embodiment of the present disclosure. FIG. 3 is an exploded perspective view of the cylinder in FIG. 2. FIG. 4 is a cross-sectional view of the cylinder in FIG. 2. FIG. 5 is an enlarged partial cross-sectional view of "A" in FIG. 4. FIG. 9 is an enlarged partial cross-sectional view of "C" in FIG. 4.

Referring to FIGS. 1 to 5 and 9, the brake device for a vehicle according to an embodiment of the present disclosure may include a housing 100, a cylinder 200, a motor 300, a screw shaft 400, a nut 500, a piston 600, a guide 700, and a cover 800.

The housing 100 has a hollow form in which an internal space is provided, and is provided on the outside (the left side of FIG. 1) of the cylinder 200.

The cylinder 200 is pressed in and installed within the housing 100, and supports torque that is generated when oil pressure attributable to a reciprocating movement of the piston 600 is formed. The cylinder 200 is assembled with the housing 100 so that the concentricity of the cylinder 200 is restricted.

The brake device for a vehicle according to an embodiment of the present disclosure may further include a sleeve 900. The cylinder 200 is formed in a hollow form the inside of which is empty. The sleeve 900 an operation section of which is provided within the cylinder 200 may be provided in a space (the left side of FIG. 1) within the cylinder 200 on one side thereof so that oil pressure is formed in the space by the pressurization of the piston 600.

The sleeve 900 is disposed within the housing 100, and is provided within the cylinder 200. The sleeve 900 induces the piston 600 to be inserted therein and moved. The sleeve 900 is formed to surround a head 620 of the piston 600.

A port 210 for enabling a hydraulic fluid to be moved is formed on the outer surface of the cylinder 200 corresponding to the sleeve 900. The port 210 is provided on both sides of the cylinder 200 in a length direction thereof. A hydraulic fluid that is moved by a movement of the piston 600 is moved through the port 210, and implements required braking pressure.

At least one cutoff hole 910 is formed in the outer surface of the sleeve 900 so that the cutoff hole 910 communicates with the port 210. A plurality of cutoff holes 910 may be formed in the circumferential direction of the sleeve 900. Accordingly, the hydraulic fluid of the sleeve 900 can be discharged in the radial direction of the piston 600.

The motor 300 is coupled to the cylinder 200. Various types of driving devices may be used as the motor 300 within the technical spirit of the present disclosure in which the motor 300 supplies rotation power. The motor 300 transfers a rotational force (i.e., torque) to the screw shaft 400.

The motor 300 may include a fixing part 310, a motor rotation part 320, and a motor bearing 330.

The fixing part 310 is fixed to the housing 100, and has various forms within the technical spirit of the present disclosure in which magnetic force of the fixing part 310 is changed by the supply of power. The fixing part 310 may include a fixing frame 311 that is fixed to one side (the right side of FIG. 1) of the housing 100 and a stator 312 that is installed on the inner surface of the fixing frame 311, which faces the motor rotation part 320, and that generates magnetic force.

The fixing frame 311 is coupled to one side of the housing 100. The motor rotation part 320 is rotatably installed within the fixing frame 311. Furthermore, the stator 312, that is, a magnet, is installed on the inner surface of the fixing frame 311 in a circumferential direction thereof. The magnetic flux of the stator 312 is changed by a control signal of a controller (not illustrated), so that the motor rotation part 320 is rotated.

The motor rotation part 320 is coupled to the screw shaft 400, and rotated with the screw shaft 400, and may be modified in various forms within the technical spirit of the present disclosure in which the motor rotation part 320 is rotated in response to a change in the magnetic force of the fixing part 310.

The motor rotation unit 320 may include a rotational frame 321 and a rotor 322. The rotational frame 321 is rotatably installed inside the stationary frame 311 in a manner that surrounds one side (the right side when FIG. 1 is viewed from top) of the cylinder 200. The rotor 322 is installed on an outer surface of the rotational frame 321 that faces the stationary unit 310 and rotates in response to the magnetic force.

The motor rotation part 320 has an approximately "C"-shaped cross section, and may be formed in the form of a hollow the inside of which is empty.

The motor bearing 330 is installed between the fixing part 310 and the motor rotation part 320, and reduces friction that occurs when the motor rotation part 320 is rotated. Furthermore, the rotor 322, that is, a plurality of magnets installed in the circumferential direction of the rotation frame 321, is rotated with the rotation frame 321 by a change in the magnetic force of the stator 312.

A cover member 340 fixed to the fixing frame 311 is installed in a form in which the cover member 340 surrounds the outside of an end of the rotation frame 321, and blocks the introduction of an alien substance.

The screw shaft 400 is provided within the cylinder 200. The screw shaft 400 is inserted in the length direction of the cylinder 200, and is axially coupled to the cylinder 200. The central axis of the cylinder 200 and the central axis of the screw shaft 400 are identical with each other.

The screw shaft 400 may include a body 410, a first coupling part 420, and a second coupling part 430. The screw shaft 400 is fixed to a bearing 1000 to be described later by a support part 1100.

The body 410 externally threaded in the lengthwise direction of the screw shaft 400 is rotatably installed inside the cylinder 200. The body 410 is positioned inside the rotational frame 321 provided on the motor 300.

The first coupling part 420 extends from an outer surface of one end (the right side when FIG. 1 is viewed from top) of the center-of-rotation portion of the body 410 and has a smaller diameter than the body 410. A spline is formed on an outer surface of the first coupling part 420 along the circumferential direction of the first coupling part 420 which faces the rotation frame 321. As a result, the rotation frame 321 and the screw shaft 400 are spline-coupled to each other. Motive power is transferred from the screw shaft 400 to the rotation frame 321.

The second coupling unit 430 extends from an outer surface of the other end of (the left side when FIG. 1 is viewed from top) of the center-of-rotation portion of the body 410 and has a smaller diameter than the body 410. The second coupling unit 430 is rotatably coupled to the bearing 1000 described below by passing therethrough.

The nut 500 is provided inside the cylinder 200, and thus is positioned inside the rotation frame 321 provided in the motor 300. The nut 500 is coupled to an outer surface of the screw shaft 400 with one or more ball members B in between.

The screw shaft 400 is coupled to the nut 500 therethrough. The ball member B is provided between the inner surface of the nut 500 and the spiral gear that is formed on the outer surface of the body 410 of the screw shaft 400, so that a rotatory motion of the screw shaft 400 can be changed into a rectilinear motion through the nut 500. That is, the nut 500 reciprocates in the axial direction of the screw shaft 400, depending on the rotation direction of the screw shaft 400.

A flange 510 may be formed at an end (the left side of FIG. 3) of the nut 500 on one side thereof, which is directed toward the motor 300. The flange 510 is formed in the circumferential direction of the nut 500, and is formed to protrude in the lateral direction of the nut 500.

The nut 500 and the flange 510 may be integrally formed. The nut 500 and the flange 510 can enhance rigidity and reduce the complexity of assembly because the flange 510 is integrally formed in the nut 500, not a separated form.

The piston 600 is coupled to the nut 500 in a form in which the piston 600 surrounds the outside of the nut 500. The piston 600 is moved in the length direction of the cylinder 200 while being interlocked with the nut 500.

The piston 600 may include a rod 610 and the head 620.

The rod 610 is formed in a hollow form, and is disposed within the rotation frame 321 provided in the motor 300. The outer surface of the nut 500 and the inner surface of the rod 610 are spirally coupled. The head 620 may be integrally formed with the rod 610. The head 620 may be formed to have a greater diameter than the rod 610.

The head 620 is formed in a ring form and disposed within the housing 100. The head 620 moves a hydraulic fluid within the sleeve 900 in a direction toward the port 210 while reciprocating within the sleeve 900. Accordingly, the cylinder 200 forms a double-action oil pressure in response to a reciprocating movement of the piston 600.

The guide 700 is provided within the cylinder 200. The guide 700 plays a role to restrict the rotation of the nut 500 and to provide guidance to a rectilinear motion of the nut 500.

The guide 700 restricts the rotation of the nut 500 and provides guidance to a movement of the nut 500 so that the nut 500 that is moved along the screw shaft 400 by the forward and backward rotation of the screw shaft 400 is not rotated in the rotation direction of the screw shaft 400. Accordingly, the nut 500 can rectilinearly move in the axial direction of the screw shaft 400.

Figure 6:
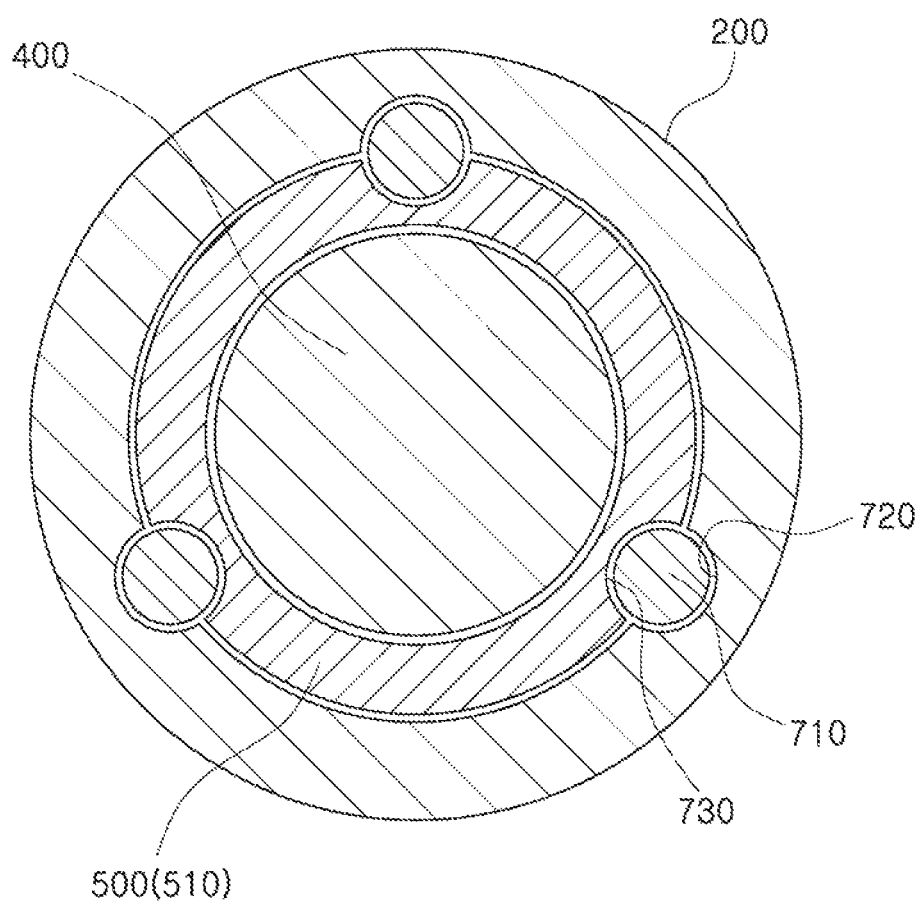
FIG. 6 is a cross-sectional view taken along line B-B in FIG. 4, for describing a first embodiment of a guide in the brake device for a vehicle according to an embodiment of the present disclosure.

FIG. 6 is a cross-sectional view taken along line B-B in FIG. 4, for describing a first embodiment of the guide in the brake device for a vehicle according to an embodiment of the present disclosure.

Referring to FIGS. 1 to 6, the guide 700 may include at least one guide member 710 that is inserted between the cylinder 200 and the nut 500 and that provides guidance to a rectilinear motion of the nut 500 by restricting the rotation of the nut 500.

The guide member 710 may have a shape of a rod that has a circular or elliptical cross section and that has a set length, or may have a shape of a pole that has an angled polygon cross section and that has a set length. An inclined plane 711 may be formed at an end of the guide member 710 on the other side thereof (the right side of FIG. 5). The inclined plane 711 may be formed in an inclined form from the outer circumference surface of the guide member 710 to the central part of the guide member 710.

A plurality of guide members 710 may be provided. The plurality of guide members 710 may be spaced apart from each other and disposed in the circumferential direction of the cylinder 200. Since the guide member 710 is lengthily formed in a predetermined length, a stroke that is necessary to form braking fluid pressure can be lengthily secured compared to the same layout.

At least one first guide groove 720 is formed on the inner surface of the cylinder 200. At least one second guide groove 730 is formed on the outer surface of the nut 500 at positions corresponding to the positions of the first guide grooves 720.

Each of the first guide grooves 720 and the second guide grooves 730 may have a predetermined length in the lengthwise direction of the cylinder 200 that corresponds to the length of the guide members 710. Each of the plurality of first guide grooves 720 and the plurality of second guide grooves 730 may be spaced apart from each other and disposed in the circumferential direction of the cylinder 200.

Each guide member 710 is disposed between a first guide groove 720 and a second guide groove 730. The nut 500 rectilinearly moves along the guide member 710.

A support protrusion 220 that supports an end of the guide member 710 on one side thereof (the left side of FIG. 1) may be formed on the inner surface of the cylinder 200. The support protrusion 220 may be formed to protrude from the inner surface of the cylinder 200. The support protrusion 220 may be formed at an end of the first guide groove 720 on one side thereof.

As another embodiment, the second guide groove 730 may be depressed and formed on the outer surface of the flange 510 so that the second guide groove 730 corresponds to the first guide groove 720. Accordingly, the flange 510 rectilinearly moves along the guide member 710.

Additionally, the guide member 710 restricts the rotation of the flange 510 integrally formed with the nut 500 and provides guidance to a movement of the flange 510 so that the nut 500 that is moved along the screw shaft 400 by the forward and backward rotation of the screw shaft 400 is not rotated in the rotation direction of the screw shaft 400. Accordingly, the nut 500 can rectilinearly move in the axial direction of the screw shaft 400.

The cover 800 is coupled to the cylinder 200, and covers the guide 700. Additionally, the cover 800 is coupled to an end of the cylinder 200 on one side thereof (the left side of FIG. 2), and fixes the guide member 710. Accordingly, the perpendicularity of the guide member 710 can be secured, and the guide member 710 can be prevented from deviating from an axial direction thereof.

The cover 800 may be elastically deformed. The cover 800 may be fabricated to include a metal material, a plastic material, or a rubber material.

The cover 800 may include a first frame 810, a second frame 820, and at least one rib 830.

The first frame 810 may have a hollow ring shape. Additionally, an opening is provided in the first frame 810. The opening is formed in a central portion of the first frame 810 and is formed through the first frame 810 in the axial direction of the cylinder 200. When the cover 800 is assembled with the cylinder 200, the screw shaft 400 is exposed to the outside through the opening formed in the first frame 810.

The second frame 820 may have a hollow ring shape. The second frame 820 is formed to have a greater diameter than the first frame 810 and is disposed around the circumference of the first frame 810. That is, the first frame 810 is disposed within the second frame 820. Accordingly, the second frame 820 is spaced apart from the first frame 810. An opening is formed between the first frame 810 and the second frame 820. The opening that is formed between the first frame 810 and the second frame 820 is formed in the axial direction of the cylinder 200. The assembly of the guide member can be detected by vision inspections through the opening that is formed between the first frame 810 and the second frame 820.

The second frame 820 may be pressed in and coupled to the outer circumference surface of the cylinder 200. Additionally, the second frame 820 may be assembled with the cylinder 200 in a form in which the second frame 820 surrounds an end of the cylinder 200 on one side thereof.

At least one rib 830 couples the first frame 810 and the second frame 820. A plurality of ribs 830 may be spaced apart from each other and disposed in the circumferential direction of the cover 800.

An interval L1 between the first frame 810 and the second frame 820 is smaller than a diameter L2 of the guide member 710. Accordingly, the end of the guide member 710, which is inserted between the cylinder 200 and the nut 500, is trapped in the first frame 810 and the second frame 820, and cannot pass through the opening between the first frame 810 and the second frame 820. Furthermore, although the length of the guide member 710 is short or long, the guide member 710 can be stably fixed and a degree of risk in which the guide member 710 and the cover 800 that are assembled with the cylinder 200 are deformed can be reduced, because each of the first frame 810 and the second frame 820 that are elastically deformed comes into contact with the inclined plane 711 formed in the guide member 710.

Figure 7:
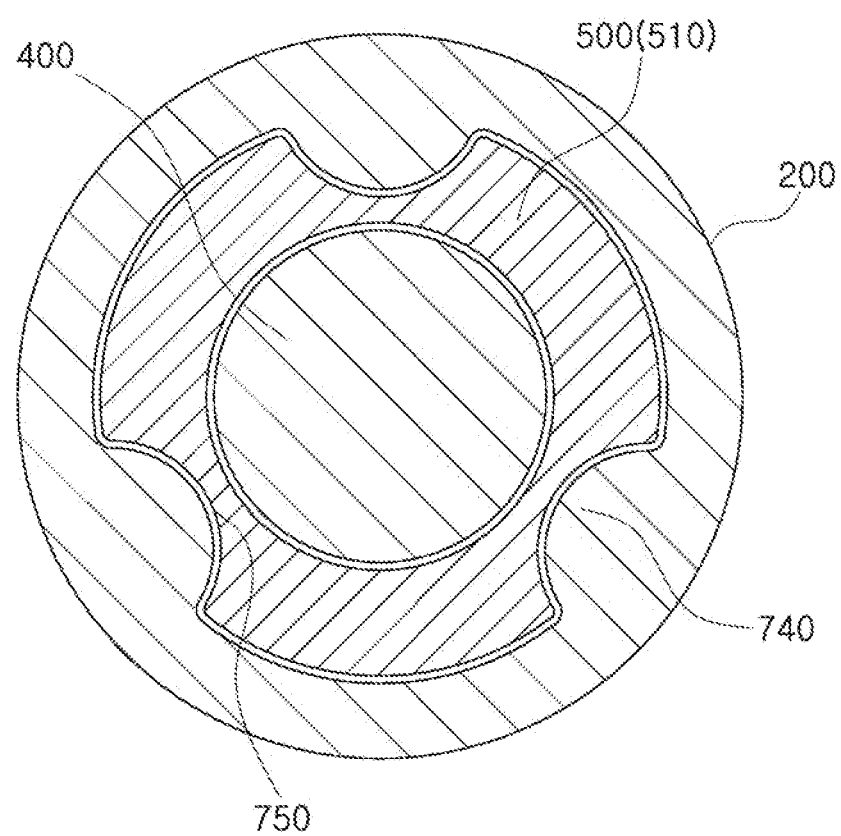
FIG. 7 is a cross-sectional view taken along line B-B in FIG. 4, for describing a second embodiment of a guide in the brake device for a vehicle according to an embodiment of the present disclosure.

FIG. 7 is a cross-sectional view taken along line B-B in FIG. 4, for describing a second embodiment of the guide in the brake device for a vehicle according to an embodiment of the present disclosure.

Referring to FIGS. 1 to 4 and 7, the guide 700 may be integrally formed with the cylinder 200 or the nut 500. Additionally, the guide 700 may be formed by processing the inner surface of the cylinder 200, and may be formed by processing the outer surface of the nut 500.

The guide 700 may include a first guide protrusion 740 that is formed to protrude from the inner surface of the cylinder 200, and a third guide groove 750 that is depressed and formed on the outer surface of the nut 500 so that the third guide groove 750 corresponds to the first guide protrusion 740.

Each of the first guide protrusion 740 and the third guide groove 750 may be provided in a plural number. Each of the plurality of first guide protrusions 740 and the plurality of third guide grooves 750 may be spaced apart from each other and disposed in the circumferential direction of the cylinder 200. Each of the first guide protrusion 740 and the third guide groove 750 may be lengthily formed in a predetermined length in the length direction of the cylinder 200. Accordingly, the nut 500 can rectilinearly move along the first guide protrusion 740.

As another embodiment, the third guide groove 750 may be depressed and formed on the outer surface of the flange 510 so that the third guide groove 750 corresponds to the first guide protrusion 740. Accordingly, the flange 510 can rectilinearly move along the first guide protrusion 740.

Figure 8:
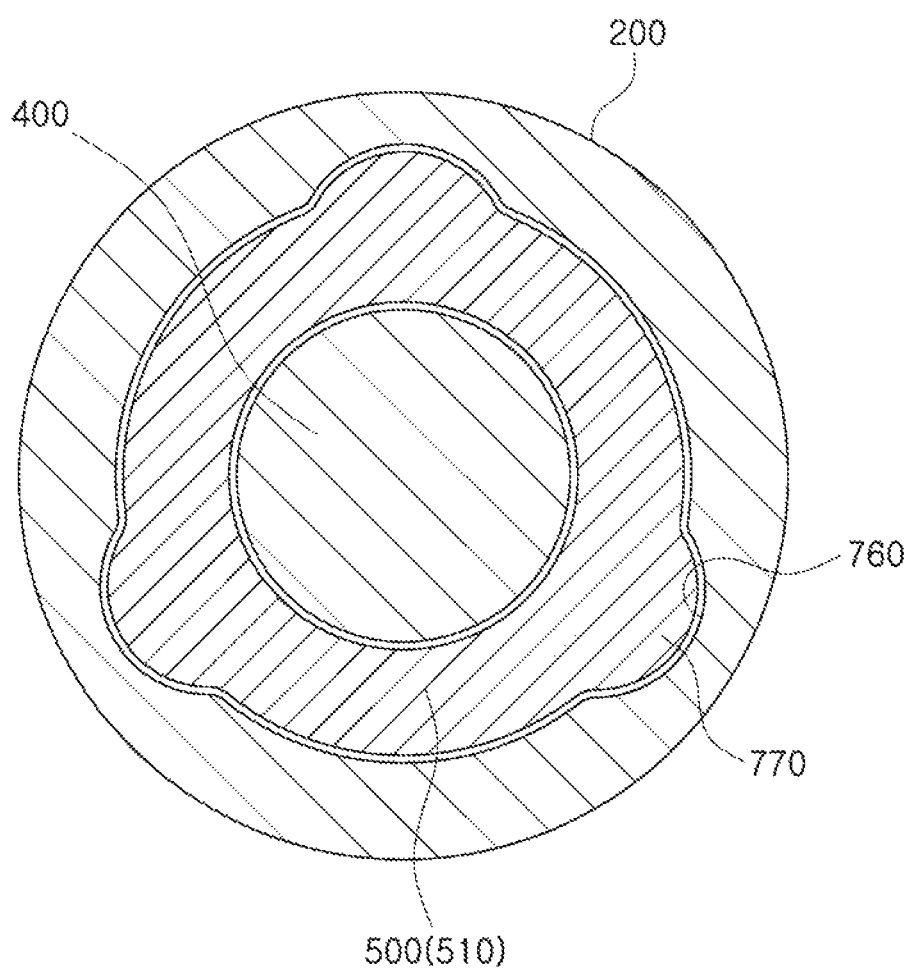
FIG. 8 is a cross-sectional view taken along line B-B in FIG. 4, for describing a third embodiment of a guide in the brake device for a vehicle according to an embodiment of the present disclosure.

FIG. 8 is a cross-sectional view taken along line B-B in FIG. 4, for describing a third embodiment of the guide in the brake device for a vehicle according to an embodiment of the present disclosure.

Referring to FIGS. 1 to 4 and 8, the guide 700 may be integrally formed with the cylinder 200 or the nut 500. Additionally, the guide 700 may be formed by processing the inner surface of the cylinder 200 and may be formed by processing the outer surface of the nut 500.

The guide 700 may include a fourth guide groove 760 that is depressed and formed on the inner surface of the cylinder 200, and a second guide protrusion 770 that is formed to protrude from the outer surface of the nut 500 so that the second guide protrusion 770 corresponds to the fourth guide groove 760.

Each of the fourth guide groove 760 and the second guide protrusion 770 may be provided in a plural number. Each of the plurality of fourth guide grooves 760 and the plurality of second guide protrusions 770 may be spaced from each other and disposed in the circumferential direction of the cylinder 200. Each of the fourth guide groove 760 and the second guide protrusion 770 may be lengthily formed in a predetermined length in the length direction of the cylinder 200. Accordingly, the nut 500 can rectilinearly move along the fourth guide groove 760.

As another embodiment, the second guide protrusion 770 may be formed to protrude from the outer surface of the flange 510 so that the second guide protrusion 770 corresponds to the fourth guide groove 760. Accordingly, the flange 510 can rectilinearly move along the fourth guide groove 760.

The brake device for a vehicle according to an embodiment of the present disclosure may further include the bearing 1000. The bearing 1000 is disposed within the housing 100, and is provided at the end of the cylinder 200 therein (the left side of FIG. 1). The bearing 1000 and the sleeve 900 are installed in the state in which one surface of the outside of the bearing 1000 and one surface of the outside of the sleeve 900 have come into contact with each other. The bearing 1000 is coupled to the screw shaft 400 in a form in which the bearing 1000 surrounds the second coupling part 430 of the screw shaft 400.

An inner wheel part 1000*a* of the bearing 1000 comes into contact with the second coupling part 430 of the screw shaft 400. An outer wheel part 1000*b* of the bearing 1000 is installed in the state in which the outer wheel part 1000*b* has come into contact with the inner surface of the cylinder 200. The bearing 1000 supports an axial load when oil pressure is formed within the cylinder 200 by the piston 600 that reciprocates in the axial direction of the screw shaft 400.

The brake device for a vehicle according to an embodiment of the present disclosure may further include the support part 1100. The support part 1100 is provided within the cylinder 200. The end of the second coupling part 430 is accommodated within the support part 1100. The bearing 1000 is fixed to the outer circumference surface of the opening of the support part 1100. The support part 1100 supports the screw shaft 400 so that the screw shaft 400 is rotatable.

The brake device for a vehicle according to an embodiment of the present disclosure may further include a retaining part 1200. Referring to FIGS. 1 to 4 and 9, the retaining part 1200 may have a shape of a circular or elliptical ring a central portion of which is formed to be penetrated in the axial direction of the screw shaft 400, and may have a shape of a polygon having an angled edge. An opening is provided in the retaining part 1200. Additionally, the retaining part 1200 may be formed to have an approximately "C" shape one side of which is opened. The retaining part 1200 may be fabricated to include a metal material, a plastic material, or a rubber material.

The retaining part 1200 is installed between the nut 500 and the piston 600. A first groove 520 is provided in the nut 500. The first groove 520 is depressed and formed on the outer surface of the nut 500. The first groove 520 is formed in the circumferential direction of the nut 500. A part of the retaining part 1200 is accommodated within the first groove 520. Additionally, the inside of the retaining part 1200 is accommodated in the first groove 520.

A second groove 611 corresponding to the first groove 520 is provided in the piston 600. The second groove 611 is depressed and formed on the inner surface of the rod 610. The second groove 611 is formed in the circumferential direction of the piston 600. The remaining part of the retaining part 1200 is accommodated within the second groove 611. Additionally, the outside of the retaining part 1200 is accommodated in the second groove 611.

The retaining part 1200 plays a role to fix a relative movement between the nut 500 and the piston 600 in an axial direction thereof so that the relative movement does not occur between the nut 500 and the piston 600. The retaining part 1200 also plays a role to prevent coupling between the nut 500 and the piston 600 from becoming released because the nut 500 and the piston 600 that have been spirally coupled become loose each other in a direction opposite to the direction in which the nut 500 and the piston 600 have been coupled.

The retaining part 1200 may be elastically deformed. Additionally, when the piston 600 is spirally coupled to the nut 500, the retaining part 1200 is deflated as an interval between the openings 1200a of the retaining part 1200 is narrowed. When the coupling between the nut 500 and the piston 600 is completed, the retaining part 1200 is elastically restored to its original form. Accordingly, the retaining part 1200 is accommodated between the first groove 520 and the second groove 611, and is seated between the nut 500 and the rod 610.

An operating process of the brake device for a vehicle having the aforementioned construction according to an embodiment of the present disclosure is described as follows.

Referring to FIGS. 1 to 4, when the piston 600 operates forward within the cylinder 200, the screw shaft 400 that is coupled to the motor 300 and provided with a rotational force of the motor 300 is axially rotated in one direction within the cylinder 200. The nut 500 is moved toward the sleeve 900 along the screw shaft 400.

The rotation of the nut 500 in one direction is restricted by the guide 700, and a movement of the nut 500 is also guided by the guide 700. Accordingly, the nut 500 rectilinearly moves in the axial direction of the screw shaft 400 in the state in which the nut 500 is not rotated.

Since the guide 700 is lengthily formed in a set length in the length direction of the cylinder 200, a stroke that is necessary to form braking fluid pressure can be lengthily formed compared to the same layout.

Accordingly, when the nut 500 is moved toward the sleeve 900, the piston 600 that is coupled to the nut 500 is interlocked with the nut 500, and forms braking fluid pressure while moving forward in a straight line within the cylinder 200.

Referring to FIGS. 1 to 4, when the piston 600 moves backward within the cylinder 200, the screw shaft 400 that has been axially rotated in one direction within the cylinder 200 is axially rotated backward. The nut 500 is moved in a direction opposite to the direction of the sleeve 900 along the screw shaft 400.

The rotation of the nut 500 in the opposite direction is restricted by the guide 700, and a movement of the nut 500 is also guided by the guide 700. Accordingly, the nut 500 rectilinearly moves in the axial direction of the screw shaft 400 in the state in which the nut 500 is not rotated.

Since the guide 700 is lengthily formed in a set length in the length direction of the cylinder 200, a stroke that is necessary to form braking fluid pressure can be lengthily secured compared to the same layout.

That is, when the nut 500 is moved in the direction opposite to the direction of the sleeve 900, the piston 600 that is coupled to the nut 500 is interlocked with the nut 500, and forms braking fluid pressure while moving backward in a straight line within the cylinder 200. Accordingly, as the piston 600 is moved forward and backward in a straight line within the cylinder 200, double-action oil pressure is formed.

Figure 10:
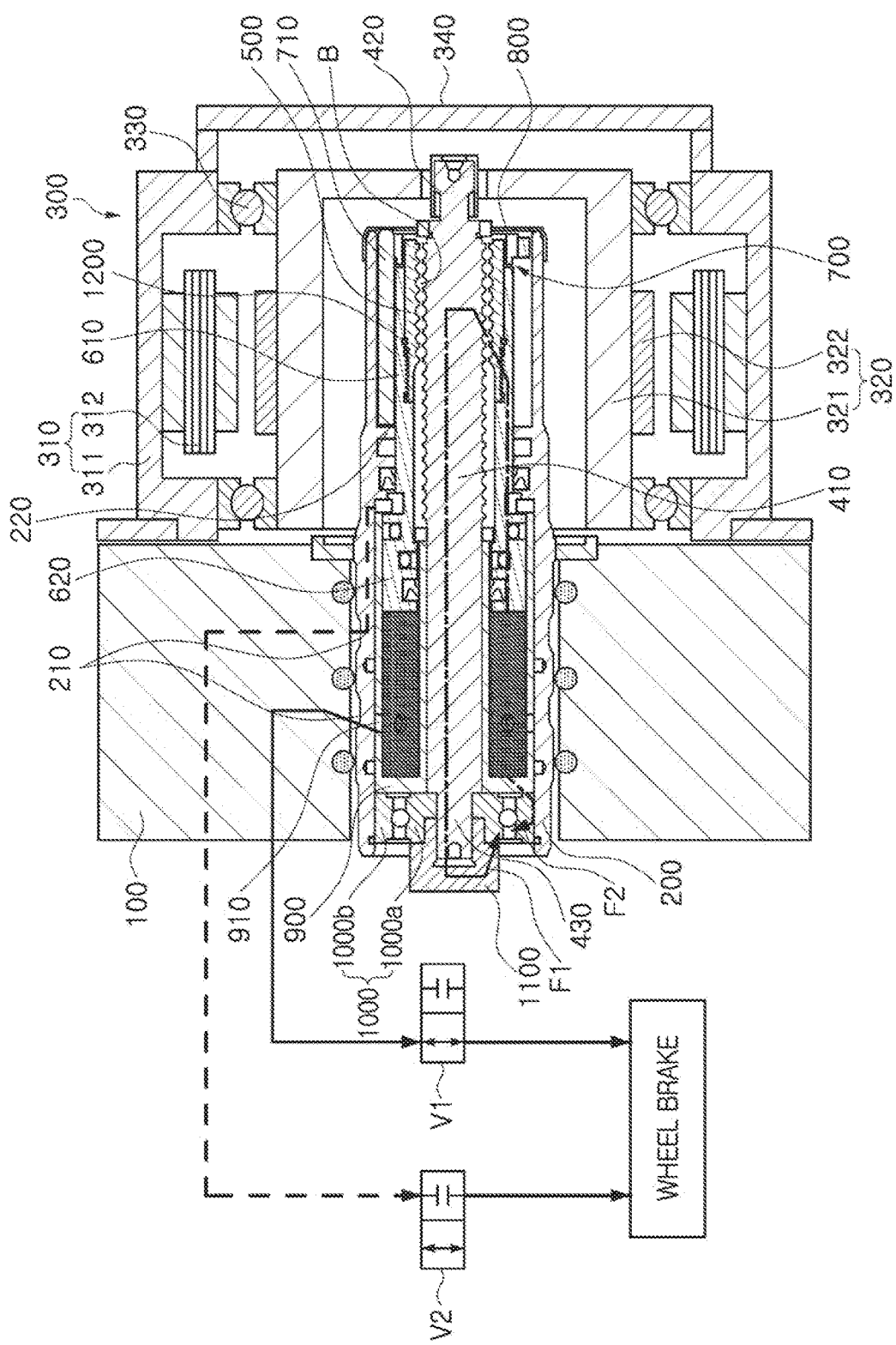
FIG. 10 is a cross-sectional view illustrating the state in which oil pressure has been formed on one side of a head of a piston in the brake device for a vehicle according to an embodiment of the present disclosure.

FIG. 10 is a cross-sectional view illustrating the state in which oil pressure has been formed on one side of the head of the piston in the brake device for a vehicle according to an embodiment of the present disclosure.

Referring to FIG. 10, in the state in which a first valve V1 that is coupled to the port 210 provided on one side of the cylinder 200 and a second valve V2 that is coupled to the port 210 provided on the other side of the cylinder 200 have been closed, oil pressure is formed on one side (the left side of FIG. 10) of the head 620 of the piston 600 and transferred to a wheel brake.

A reaction that forces the head 620 to move to the other side (the right side of FIG. 10) of the cylinder 200 is formed by pressure formed by the oil pressure. A force by the reaction is transferred in order of the head 620, the rod 610, the nut 500, the body 410, the second coupling part 430, the support part 1100, and the inner wheel part 1000a, thus forming a first force F1. Furthermore, a force attributable to weight that is formed by the oil pressure is transferred in order of the sleeve 900 and the outer wheel part 1000b, thus forming a second force F2.

At this point, an area on which the first force F1 is exerted due to the hydraulic pressure and an area on which the second force F2 is exerted due to the hydraulic pressure are the same (F1=F2). As a result, the axial load that results from generating the hydraulic pressure causes a force equilibrium between the inner wheel part 1000a and the outer wheel part 1000b of the bearing 1000 inside the cylinder 200. As a result, because the axial load is not transmitted to the outside, the axial load is not applied to the motor 300.

Figure 11:
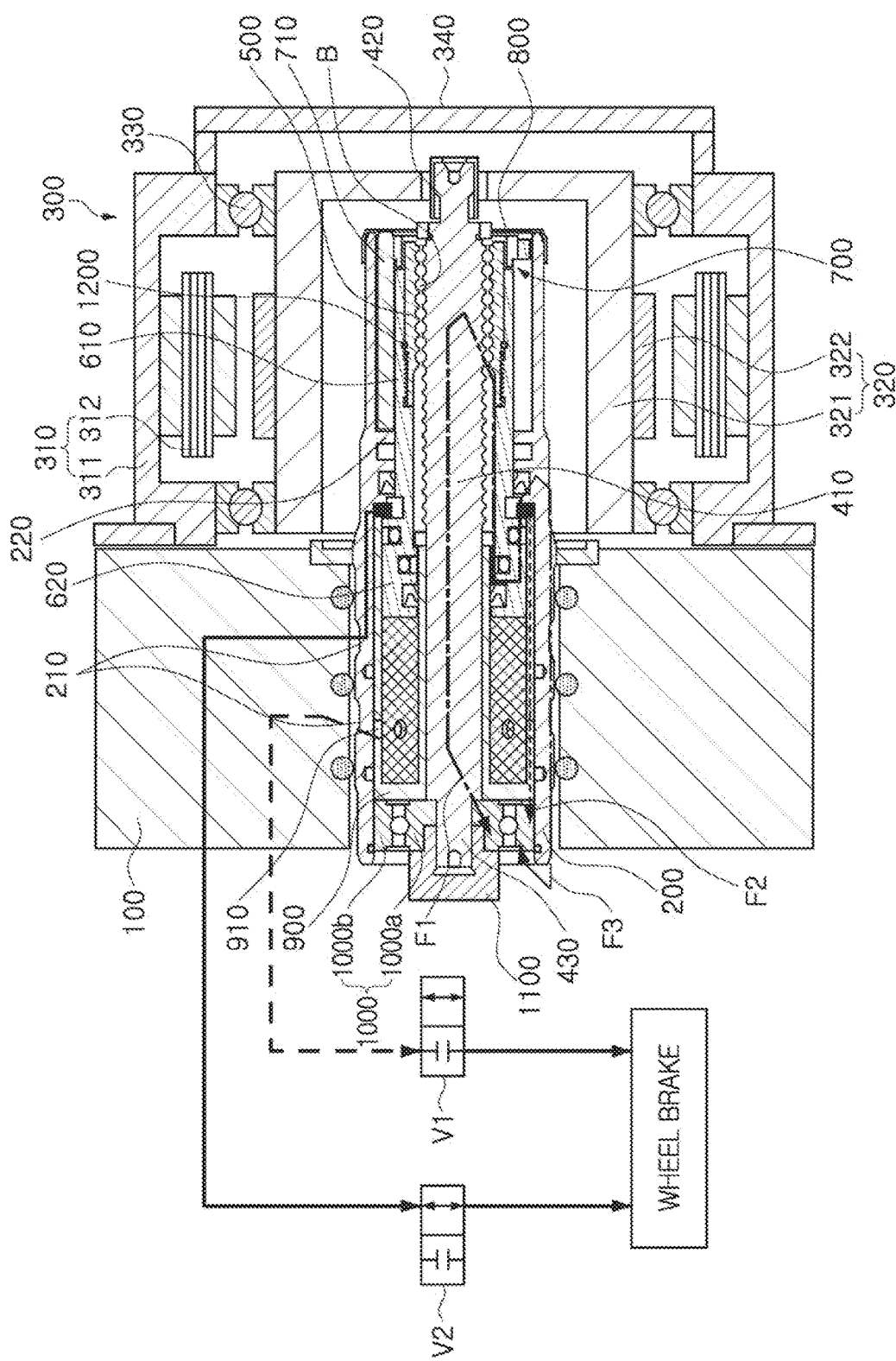
FIG. 11 is a cross-sectional view illustrating the state in which oil pressure has been formed on the other side of the head of the piston in the brake device for a vehicle according to an embodiment of the present disclosure.

FIG. 11 is a cross-sectional view illustrating the state in which oil pressure has been formed on the other side of the head of the piston in the brake device for a vehicle according to an embodiment of the present disclosure.

Referring to FIG. 11, in the state in which the first valve V1 that is coupled to the port 210 provided on one side of the cylinder 200 has been closed and the second valve V2 that is coupled to the port 210 provided on the other side of the cylinder 200 has been opened, oil pressure is formed on the other side (the right side of FIG. 11) of the head 620 of the piston 600 and transferred to the wheel brake.

A reaction that forces the head 620 to move to one side (the left side of FIG. 11) of the cylinder 200 is formed by pressure formed by the oil pressure. A force by the reaction is transferred in order of the head 620, the rod 610, the nut 500, the body 410, and the inner wheel part 1000a, thus forming a first force F1. The force is transferred in order of the sleeve 900 and the outer wheel part 1000b, thus forming a second force F2. Furthermore, a force attributable to weight that is formed by the oil pressure is transferred in order of the cylinder 200 and the outer wheel part 1000b, thus forming a third force F3.

In this case, since the sum of the areas in which the oil pressure of the first force F1 and the second force F2 operates is the same as the area in which the oil pressure of the third force F3 operates (i.e., F1+F2=F3), the forces by an axial load according to the forming of the oil pressure are balanced between the inner wheel part 1000a and outer wheel part 1000b of the bearing 1000 within the cylinder 200. Accordingly, the axial load is not applied to the motor 300 because the axial load is not transferred to the outside.

Figure 12:
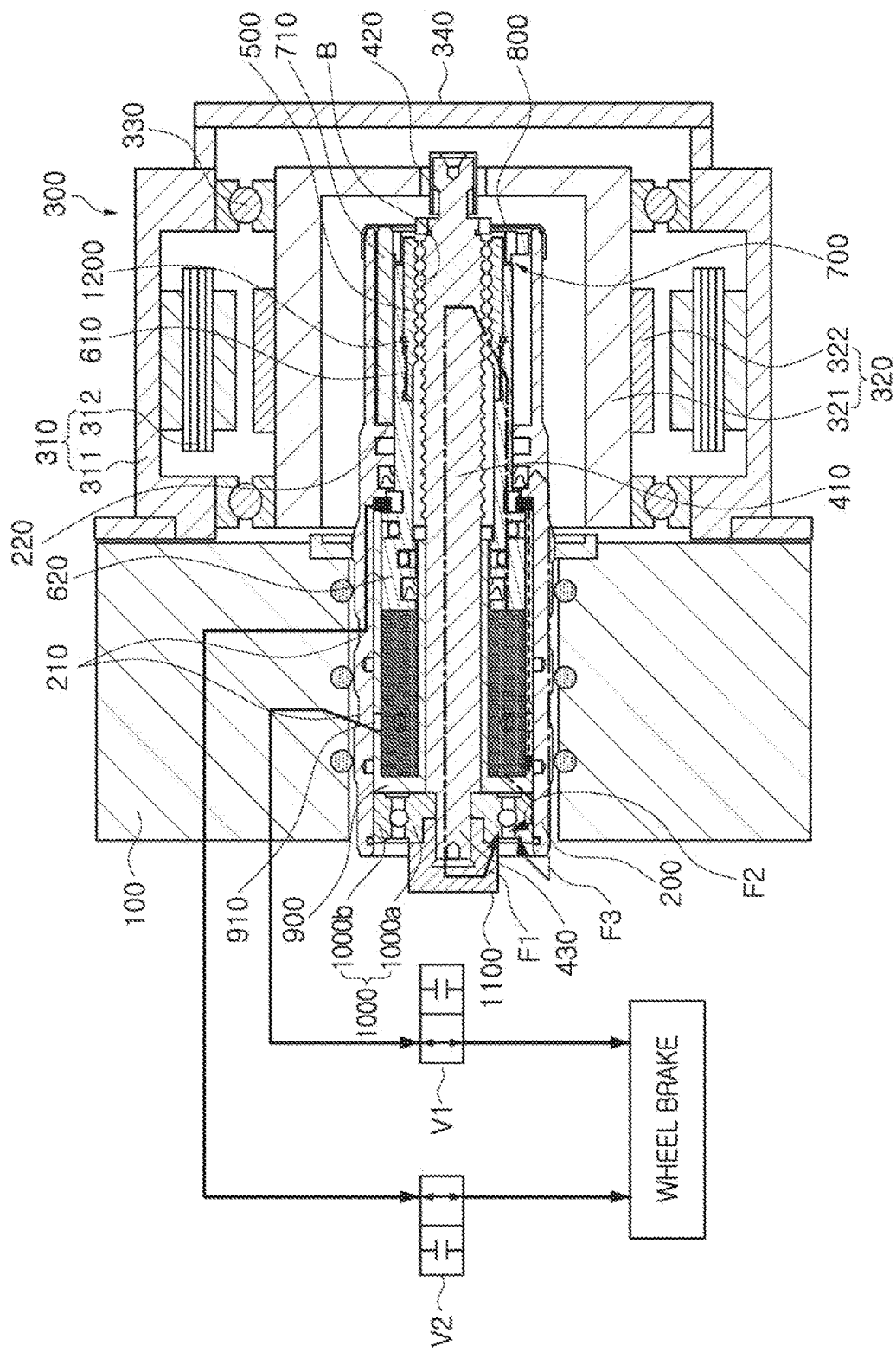
FIG. 12 is a cross-sectional view illustrating the state in which oil pressure has been formed on both sides of the head of the piston in the brake device for a vehicle according to an embodiment of the present disclosure.

FIG. 12 is a cross-sectional view illustrating the state in which oil pressure has been formed on both sides of the head of the piston in the brake device for a vehicle according to an embodiment of the present disclosure.

Referring to FIG. 12, in the state in which the first valve V1 that is coupled to the port 210 provided on one side of the cylinder 200 has been opened and the second valve V2 that is coupled to the port 210 provided on the other side of the cylinder 200 has been opened, oil pressure is formed on both sides of the head 620 of the piston 600 and transferred to the wheel brake.

A reaction that forces the head 620 to move to the other side (the right side of FIG. 12) of the cylinder 200 is formed by pressure formed by the oil pressure in the sleeve 900 that is disposed on one side (the left side of FIG. 12) of the head 620. A force by the reaction is transferred in order of the head 620, the rod 610, the nut 500, the body 410, the second coupling part 430, the support part 1100, and the inner wheel part 1000a, thus forming a first force F1. A reaction that forces the head 620 to move to one side (the left side of FIG. 12) of the cylinder 200 is formed by pressure formed by the oil pressure in the sleeve 900 that is disposed on the other side (the right side of FIG. 12) of the head 620. A force by the reaction is transferred in order of the cylinder 200 and the outer wheel part 1000b, thus forming a third force F3.

Furthermore, a force attributable to weight that is formed by the oil pressure is transferred in order of the sleeve 900 and the outer wheel part 1000b, thus forming a second force F2.

In this case, since the sum of the areas in which the oil pressure of the first force F1 and the third force F3 operates is the same as the area in which the oil pressure of the second force F2 operates (i.e., F1+F3=F2), the forces by an axial load according to the forming of the oil pressure are balanced between the inner wheel part 1000a and outer wheel part 1000b of the bearing 1000 within the cylinder 200. Accordingly, the axial load is not applied to the motor 300 because the axial load is not transferred to the outside.

The brake device for a vehicle according to an embodiment of the present disclosure has effects in that it can change a rotatory motion of the screw shaft 400 into a rectilinear motion of the piston 600, can reduce costs, and can improve NVH performance, through the construction of the guide 700 that restricts the rotation of the nut 500 moving along the screw shaft 400 and that provides guidance to a rectilinear motion of the nut 500.

The brake device for a vehicle according to an embodiment of the present disclosure has effects in that it can prevent the guide member 710 from deviating from its axial direction and can easily check whether the guide member 710 has been assembled in position, through the construction of the cover 800 that is pressed in and fixed to the cylinder 200.

The brake device for a vehicle according to an embodiment of the present disclosure has an effect in that it can prevent loosening between the nut 500 and the piston 600 that are spirally coupled together through the construction of the retaining part 1200 that is installed between the nut 500 and the piston 600.

The brake device for a vehicle according to an embodiment of the present disclosure has an effect in that an axial load attributable to oil pressure is not transferred to the motor 300 because the axial load attributable to a reaction when the oil pressure is formed can be bidirectionally supported through the bearing 1000 that is coupled to the cylinder 200.

The brake device for a vehicle according to an embodiment of the present disclosure has an effect in that weight and the sizes of the housing 100 and the bearing 1000 can be reduced because the axial load is not supported by the motor 300.

The brake device for a vehicle according to an embodiment of the present disclosure has effects in that costs can be reduced and a full length in an axial direction can be reduced because the existing axial alignment assembly single products can be omitted by using perpendicularity and concentricity compensations using a gap of the bearing 1000 itself.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake device for a vehicle, comprising:
a housing;
a cylinder within the housing;
a motor coupled to the cylinder and configured to generate a rotational force;
a screw shaft within the cylinder and axially rotated by the rotational force of the motor;
a nut coupled to the screw shaft through a medium of a ball member and configured to reciprocate in an axial direction of the screw shaft in response to a rotation direction of the screw shaft;
a piston configured to be reciprocated by the nut;
a guide provided within the cylinder and configured to restrict rotation and guide a rectilinear motion of the nut; and
a cover coupled to the cylinder and configured to cover the guide, and
further comprising a sleeve positioned within the cylinder in which the piston is received and within which the piston is reciprocated.

2. The brake device of claim 1, wherein:
the cylinder includes a port via which hydraulic fluid passes, and
the sleeve includes a cutoff hole in fluid communication with the port.

3. The brake device of claim 2, wherein the piston comprises:
a rod spirally coupled to an outer surface of the nut; and
a head integrally formed with the rod and configured to reciprocate within the sleeve in a longitudinal direction of the sleeve.

4. The brake device of claim 1, wherein the guide comprises a guide member between the cylinder and the nut.

5. The brake device of claim 4, wherein the guide comprises:
a first guide groove formed on an inner surface of the cylinder, and a second guide groove formed on an outer surface of the nut at a position that corresponds to a position of the first guide groove, wherein the guide member is received within the first guide groove and the second guide groove.

6. The brake device of claim 5, wherein the cylinder includes a support protrusion that protrudes from the inner surface of the cylinder and is configured to support an end of the guide member, the support protrusion being positioned at one end of the first guide groove.

7. The brake device of claim 6, wherein the guide member has an end that includes an inclined plane that is inclined toward a central part of the guide member, the inclined plane being arranged at an end of the guide member opposite that of the support protrusion.

8. The brake device of claim 5, wherein the nut includes a flange on one end thereof, wherein the second guide groove is formed on an outer surface of the flange, and the flange moves rectilinearly along the guide member.

9. The brake device of claim 4, wherein the cover comprises:

a first frame and a second frame each having a hollow ring shape, the second frame surrounding the first frame; and at least one rib interconnecting the first frame and the second frame.

10. The brake device of claim 9, wherein:

the cover comprises an elastically deformable material, and the second frame is coupled to an outer circumferential surface of the cylinder by the at least one rib.

11. The brake device of claim 9, wherein a space between the first frame and the second frame is smaller than a diameter of the guide member.

12. The brake device of claim 1, wherein the guide comprises:

a first guide protrusion that protrudes from an inner surface of the cylinder, and a third guide groove formed on the outer surface of the nut at a position to receive the first guide protrusion, wherein the nut moves rectilinearly along the first guide protrusion.

13. The brake device of claim 1, wherein the guide comprises:

a fourth guide groove formed on the inner surface of the cylinder, and a second guide protrusion protruding from the outer surface of the nut at a position to receive the second guide protrusion, wherein the nut rectilinearly moves along the fourth guide groove.

14. A brake device for a vehicle, comprising:

a housing;

a cylinder within the housing;

a motor coupled to the cylinder and configured to generate a rotational force;

a screw shaft within the cylinder and axially rotated by the rotational force of the motor;

a nut coupled to the screw shaft through a medium of a ball member and configured to reciprocate in an axial direction of the screw shaft in response to a rotation direction of the screw shaft;

a piston configured to be reciprocated by the nut;

a guide provided within the cylinder and configured to restrict rotation and guide a rectilinear motion of the nut; and a cover coupled to the cylinder and configured to cover the guide, and further comprising a bearing provided within the cylinder, the bearing being coupled to the screw shaft and configured to support an axial load when oil pressure is formed within the cylinder.

15. The brake device of claim 14, wherein the motor comprises:

a fixing part fixed to the housing and configured to produce a varying magnetic force when supplied with electric power;

a motor rotation part connected to the screw shaft and configured to rotate in unison with the screw shaft in response to changes in the magnetic force produced by the fixing part; and a motor bearing installed between the fixing part and the motor rotation part and configured to reduce friction when the motor rotation part is rotated.

16. The brake device of claim 15, wherein the motor rotation part comprises:

a rotation frame rotatably received within the fixing part, the rotation frame surrounding one side of the cylinder; and a rotor installed on an outer surface of the rotation frame that is arranged facing the fixing part and configured to be rotated by the magnetic force.

17. The brake device of claim 16, wherein the screw shaft comprises:

a body rotatably received within the cylinder and having a spiral gear formed on an outer surface of the body;

a first coupling part extending from the body to one side thereof and coupled to the rotation frame by a spline part; and a second coupling part extending from the body to another side thereof and rotatably coupled to the bearing.

18. A brake device for a vehicle, comprising:

a housing;

a cylinder within the housing;

a motor coupled to the cylinder and configured to generate a rotational force;

a screw shaft within the cylinder and axially rotated by the rotational force of the motor;

a nut coupled to the screw shaft through a medium of a ball member and configured to reciprocate in an axial direction of the screw shaft in response to a rotation direction of the screw shaft:

a piston configured to be reciprocated by the nut;

a guide provided within the cylinder and configured to restrict rotation and guide a rectilinear motion of the nut; and a cover coupled to the cylinder and configured to cover the guide, and further comprising:

a retaining part positioned between the nut and the piston and having an opening.

19. The brake device of claim 18, wherein:

the nut has an outer surface including a first groove in which the retaining part is partially received, and the piston has an inner surface including a second groove in which the retaining part is partially received.

* * * * *